Dec. 19, 1961 L. HANEWINKEL 3,014,202

SELECTOR FOR SELECTING CHANNELS

Filed Nov. 20, 1957 3 Sheets-Sheet 1

Inventor:
Lorenz Hanewinkel
By Silverman + Mullin
Attys.

Inventor.
Lorenz Hanewinkel.
By Silverman + Mullin
Att'ys

Dec. 19, 1961 L. HANEWINKEL 3,014,202

SELECTOR FOR SELECTING CHANNELS

Filed Nov. 20, 1957 3 Sheets-Sheet 3

Inventor,
Lorenz Hanewinkel,
By Silverman + Mullin
Attys.

United States Patent Office 3,014,202
Patented Dec. 19, 1961

3,014,202

SELECTOR FOR SELECTING CHANNELS

Lorenz Hanewinkel, Neukirchen, Germany, assignor to Zuse KG, Neukirchen, Germany Filed Nov. 20, 1957, Ser. No. 697,694
Claims priority, application Germany Nov. 29, 1956
4 Claims. (Cl. 340—166)

This invention relates to selecting devices for the selection of one or more channels, tracks or the like out of a given number of channels for transmission of information, particularly in automatic computing devices.

Solutions of the problem to select one or several branch circuit connections, channels, tracks or similar transmission ways for the purpose of transmission of information are known, particularly in the field of automatic computers. With magnetic drum storage devices, the storage locations are, for instance, distributed upon several drum tracks or channels from which one or several individual tracks or the like are chosen for proper processing of information by means of selecting devices. The problem on hand arises also with ferrite core matrices and similar information storing, processing and/or transmitting elements. Also in this instance solutions of the problem are known.

An extremely simple device, which, however, works at a low rate of speed, is known as pyramid selector, built-up of pyramidally arranged transfer contacts. On the other hand there are known electronic means in the form of proper logical organization of diodes which in turn are controlling electronic tubes for transmission.

In the following specification a new logical organization of extreme simplicity and requiring a minor amount of technical means for solution of the problem in question will be described in detail with reference to the accompanying drawings.

In these drawings like characters of reference are used, so far as practicable, to designate the same or equivalent elements throughout the several figures of said drawings.

Figure 1:
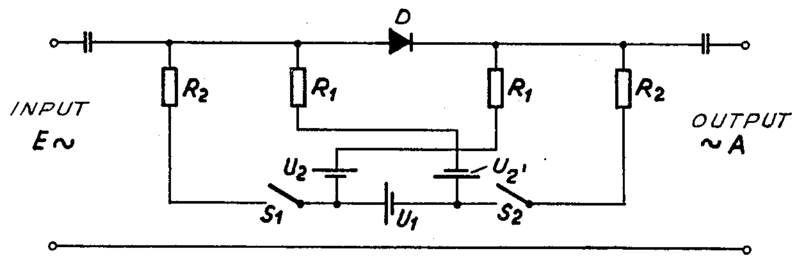
FIG. 1 is a simplified circuit diagram of a selector of the construction of the invention with resistance-capacitance coupling.

The basic principle of the logic organization resides in the fact that a rectifier is conductive for alternating current if supplied with direct current and will block the alternating current if supplied with a counter-voltage. Besides the logic organization according to FIGS. 1 and 2, combinations of both systems may be used.

If the switches, indicated in the drawings at $S_1$ and $S_2$, are closed, direct current will pass through the rectifier D. Thus, the passage from input E to output A or vice versa will be open for an arriving alternating current signal. If, on the other hand the switches $S_1$ or $S_2$, or both of them, are open, the rectifier D is subject to a blocking voltage from the batteries $U_2$ and $U_2'$. The passage is blocked for said alternating current signal if the blocking voltage is higher than the alternating voltage.

In order to achieve an optimum attenuation coefficient resistors $R_1$ should have resistance values as high as possible, in the range of the blocking resistance values of their respective associated rectifier; whereas resistors $R_2$ and the capacitors should correspond to the respective output resistance values of generators, output load circuits and rectifiers.

Figure 2:
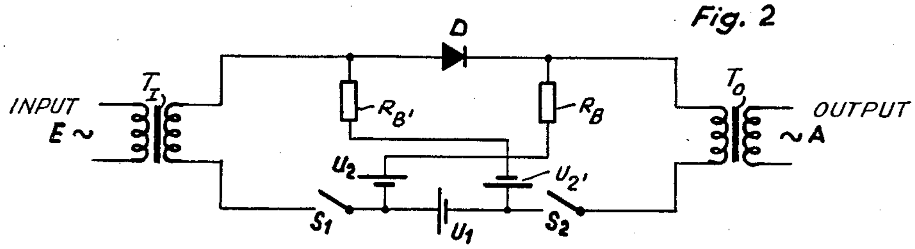
FIG. 2 is a similar circuit diagram but of a slightly different form, using inductive coupling.

The transformer coupled circuit of FIG. 2 uses input transformer $T_1$ and output transformer $T_0$ to provide a modified form of the invention with good adaptation capabilities. The bias from the batteries $U_2$ and $U_2'$ is applied through respective resistors $R_B$ and $R_B'$ to block the current flow through the rectifier D. The closing of the switch $S_1$ changes the bias condition to the left of the rectifier D, while closing of the switch $S_2$ switches the bias condition at the right of the rectifier D. This permits current to pass through one winding of the transformer $T_1$ in accordance with the modulations of the signal applied at the input E. These in turn are transmitted through the rectifier D and the completed path through one winding of the transformer $T_0$ to provide a corresponding signal at the output A.

Figure 3:
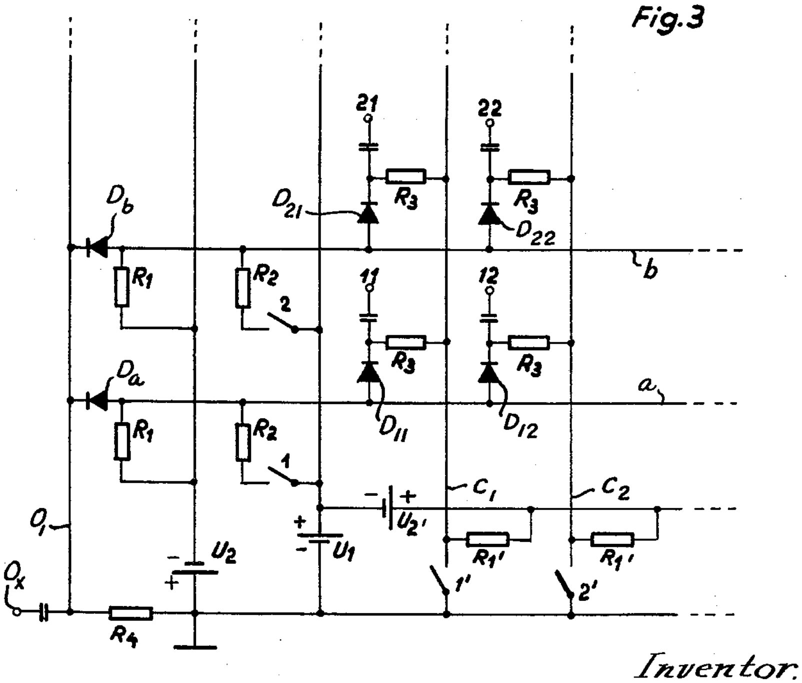
FIG. 3 is a simplified circuit diagram of a matrix selector constructed in accordance with the principles of the selector of FIG. 1.
Figure 4:
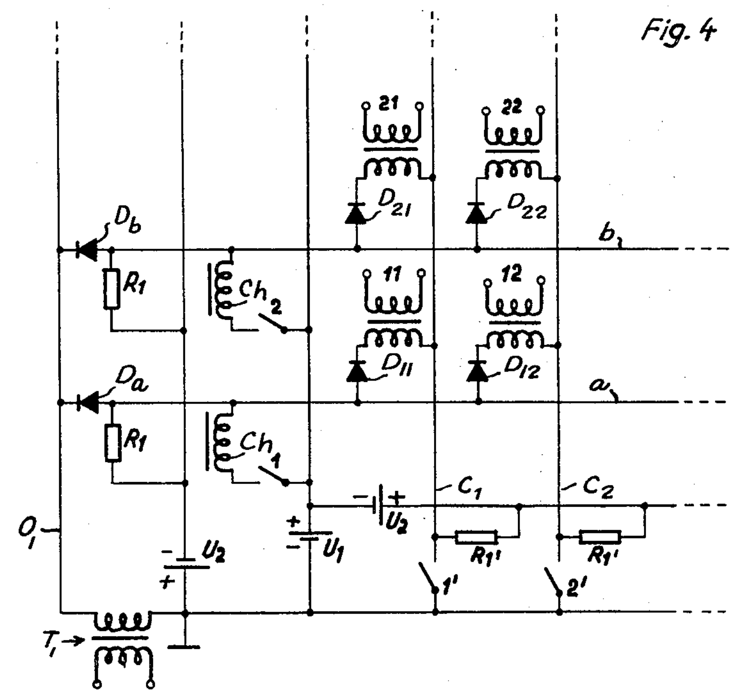
FIG. 4 is a simplified circuit diagram of a matrix selector constructed in accordance with the principles of the selector of FIG. 2.

FIGS. 3 and 4 show matrix selectors, built up on the basis of the above described structure of FIGS. 1 and 2 respectively. By way of example: channel 11 is selected if the switches 1 and 1' both are closed. Thus, the battery $U_2$ provides a bias through resistor $R_1$ to one side of the respective rectifiers $D_a$, $D_b$ etc. connected in the respective row *a, b,* etc. and one side of the respective channel rectifiers $D_{11}$, $D_{22}$, etc. The other side of the respective rectifiers $D_a$, $D_b$ etc. is biased by the battery $U_1$ extended through the resistor $R_4$ to the output line $O_1$ so that there is no current flow through rectifiers $D_a$, $D_b$ etc. The other side of the respective rectifiers $D_{11}$, $D_{12}$ etc. is biased by the battery potential extended from $U_2'$ through respective resistors $R_1'$ in FIG. 3, the column conductors $C_1$, $C_2$ etc. and the respective resistors $R_3$ so that there is no current flow through rectifiers $D_{11}$, $D_{22}$ etc. to the respective row conductors *a, b,* etc.

Closing the switches 1 and 1' changes the bias condition on the related row and column conductors *a* and $C_1$ so that the rectifier $D_{11}$ and the associated rectifier $D_a$ are enabled to pass current. It will be seen from this that the application of a positive bias through the switch 1 and the resistor $R_2$ causes a potential on the row conductor *a* to swing positive, while a negative potential applied through the switch 1' causes the column conductor $C_1$ to swing negative so that rectifier $D_{11}$ at channel 11 may pass current. This current is modulated by the signal appearing at the channel 11 and transmitted through the rectifier $D_a$ to the output at $O_x$.

In FIG. 4 which is similar in principle to FIG. 3, it will be seen that the respective A.C. input channels are bridged by one of the windings of the transformers indicated at 11, 12, 21 and 22 respectively. These are arranged in a matrix of rows and columns with the second winding of each transformer in a row having a common terminal connected through respective rectifiers $D_{11}$, $D_{12}$, etc., for example to a row conductor *a*. Each row conductor *a* and *b*, for example, has a respective rectifier $D_a$ and $D_b$, for example, connected to a common output lead $O_1$ and arranged to pass current between the common conductor $O_1$ and the row lead *a,* for example, to provide an output at transformer $T_1$ on the application of the proper potential across the rectifiers $D_a$, $D_b$, etc. A bias voltage derived from battery $U_2$ is applied through resistors $R_1$ to each row while a bias voltage from battery $U_2'$ is applied through corresponding resistors $R_1$ to each column conductor $C_1$, $C_2$, etc., these being tied directly to the second terminals of the transformer windings connected in the respective columns.

Closing switch 1, for example, applies a positive potential from the battery $U_1$ through the associated inductor $Ch_1$ to bias the junction of the rectifier $D_a$ in the row *a* for conduction, while closing switch 1' applies negative potential from the battery $U_2$ to the associated first column conductor $C_1$. The output winding of the transformer 11 being across the junction of row *a* and the column conductor $C_1$, the rectifier $D_{11}$ will now conduct and the direct current passing therethrough is modulated by the A.C. current of the selected channel, 11 in this case. This modulated D.C. current now flows through the common row rectifier $D_a$ to permit the A.C. component to be passed by the output transformer $T_1$. Likewise, upon closing switch 2, the operating bias from battery $U_1$ will be applied through inductor $Ch_2$ to bias rectifier $D_b$, while closing of switch 2' changes the bias on the column conductor $C_2$ to select the channel represented by transformer 22 in the manner previously described for channel 11.

Figure 5:
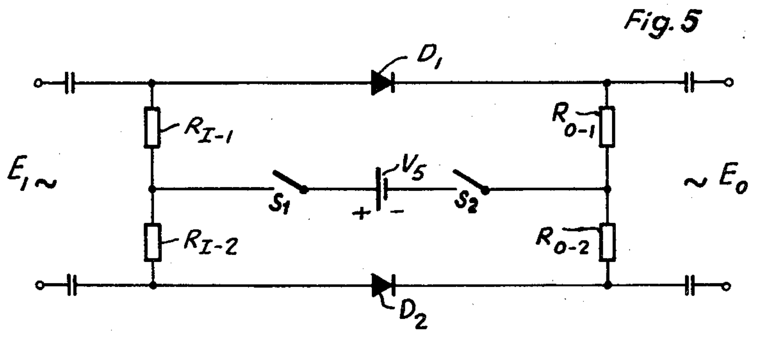
FIG. 5 is a simplified circuit diagram of a modified form of FIG. 1 but using a symmetrical arrangement.
Figure 6:
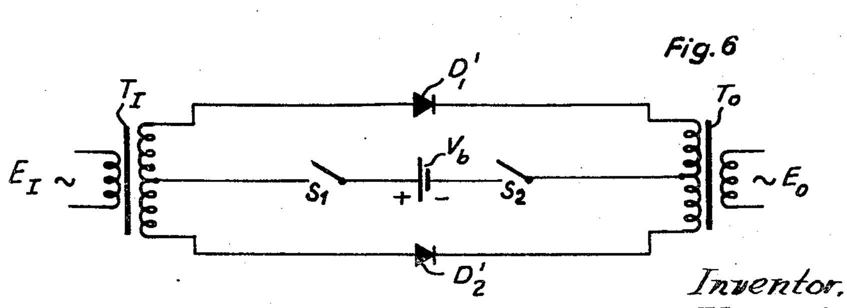
FIG. 6 is a similar circuit diagram of a modified form of FIG. 2.

If the circuit is symmetrical, as shown in FIGS. 5 and 6, no counter-voltage is required for blocking, because then the polarity of both rectifiers $D_1$ and $D_2$ in FIG. 5 and $D_1'$ and $D_2'$ in FIG. 6 will be juxtaposed, so that thereby a half-wave each of the alternating voltage indicated at the input $E_I$ is blocked until the switches $S_1$ and $S_2$ are closed to enable the production of an output signal indicated at $E_0$.

Upon the closing of the switches $S_1$ and $S_2$ in FIG. 5 a negative potential is applied through resistors $R_0$—1 and $R_0$—2 to each rectifier $D_1$ and $D_2$, while a positive potential is applied through resistors $R_I$—1 and $R_I$—2 in the opposite direction. Rectifiers $D_1$ and $D_2$ then both will be conducting current normally, modulated by the full input signal $E_I$ to supply a resulting output signal at $E_0$.

In FIG. 6, closing the switches $S_1$ and $S_2$ applies negative and positive potential through transformers $T_0$ and $T_I$ respectively to bias rectifiers $D_1'$ and $D_2'$ for conduction. The current will be modulated in accordance with the signal $E_I$ provided at transformer $T_I$ to provide a corresponding output $E_0$ at transformer $T_0$.

Thus merely low blocking voltages need be supplied for rectifiers $D_1$, $D_2$, $D_1'$ and $D_2'$ by the batteries $U_5$ and $U_6$. In the event that semi-conductors are provided as rectifiers these are operated in their highly blocking range.

Figure 7:
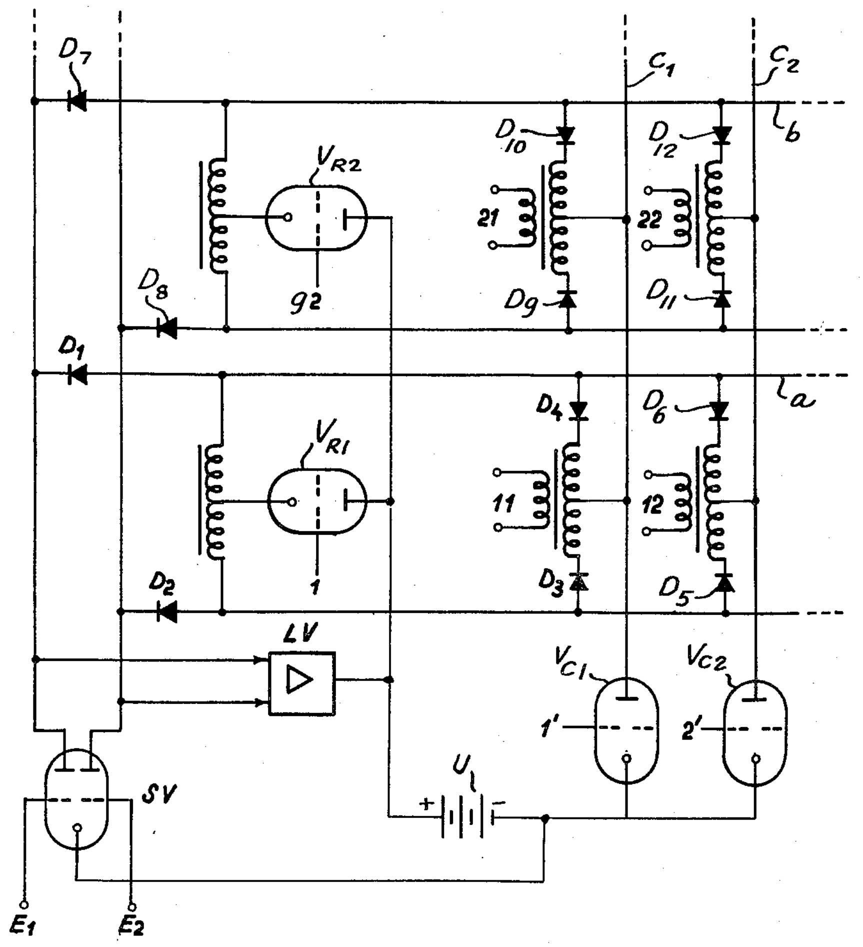
FIG. 7 is a simplified circuit diagram of a matrix selector constructed in accordance with the principles of the selector of FIG. 6.

FIG. 7 illustrates a circuit diagram of a matrix selector operating in accordance with the principles of the structure illustrated in FIG. 6 applied, for example, to electronic track selection in a magnetic drum storage device. In this form of the invention, electronic tubes $V_R$ and $V_{R2}$ are substituted in place of the row switches *a* and 2 respectively of FIG. 6, while electronic tubes $V_{C1}$ and $V_{C2}$ are substituted in place of the column conductor switches 1' and 2' respectively of FIG. 6. An input or writing amplifier operating in a push-pull connection is indicated at SV, with the output or reading amplifier symbolically indicated at LV.

If for instance it is desired to select only channel 11, the grid $S_1$ of the electronic tube $V_{R1}$ is made positive relative to its cathode by any suitable switching means or circuitry which is believed to be obvious and hence is not shown, and the normally non-conducting tube $V_{C1}$ is rendered conductive. The remaining tubes continue to be non-conductive. In this circuit, the tube $V_{R1}$ acts as a cathode follower and provides the writing amplifier SV as well as the tube $V_{C1}$ with plate voltage, while also providing the rectifiers $D_1$ and $D_2$ with biasing current and the rectifiers $D_3$ and $D_4$ with current. Rectifiers $D_5$, $D_6$, $D_7$, $D_8$, $D_9$, $D_{10}$, $D_{11}$ and $D_{12}$ remain in non-conductive state, along with the tubes $V_{R2}$ and $V_{C2}$.

One of the most important advantages of the automatic electrical selection for tracks according to the present invention in comparison to other known systems lies in the fact that especially for a larger amount of channels considerably less electronic tubes are required, to wit, only the sum total of the amount of provided matrix lines and matrix columns. Previously known selecting devices require at least one system of electronic tubes for each channel. Further simplification is achieved by forming groups of several channels for selection, instead of selecting one channel only.

What it is desired to secure by Letters Patent of the United States is:

1. An arrangement for use in selecting one of a plurality of channels arranged in a matrix of rows and columns with each channel comprising a transformer having primary and secondary windings, one winding being connected to the output of its respective channel and wherein a conductor is provided individual to each row and a conductor is provided individual to each column to provide the input control of a channel, the improvement comprising a first circuit having a unidirectional device for each channel connecting the other winding of the transformer in each channel to a respective one of the row conductors and arranged to pass current in one direction between the respective row conductor and the respective said other winding to a respective column conductor, another circuit having a unidirectional device connected between each respective row conductor and an output conductor, a potential bias source applied between each row conductor and each column conductor for blocking current flow across said first and other said circuits, and means for selectively connecting another bias potential to each of said column conductors and to each of said row conductors between the said circuits whereby the first said circuit connected between the selected row and column conductor passes current in one direction and the respective other said circuit connected between the selected row conductor and output conductor passes current in another direction.

2. The arrangement claimed in claim 1 in which each column conductor is connected to a tap between the ends of each other winding in its column and said row conductors each comprise a pair of conductors connected at opposite ends of the other windings in the respective row through a respective one of said first circuits.

3. The arrangement claimed in claim 1 in which each of said circuits consists of a solid element rectifier.

4. An arrangement for selecting one of a plurality of A.C. channels arranged in a matrix of rows and columns with each channel comprising a transformer having a primary and a secondary winding, one of said windings being an output of its respective channel and a second winding being an input thereof, the improvement comprising a plurality of conductors each individual to a different row and a plurality of conductors each individual to a different column to provide the input control of a channel, a potential bias source $V_2$ and $V_2'$ connected to each row and column conductor, a first circuit having a unidirectional device for each transformer connecting one side of the respective second of said windings to a corresponding one of said plurality of row conductors and polarized to block current flow in one direction by application of said bias source and $V_2$ and $V_2'$ through its respective said second winding and the row conductor to a respective column conductor, a plurality of other circuits having the unidirectional devices each individual to a different row conductor and connected to said bias source so as to prevent current flow in said one direction between its row conductor and said bias source whereby current flow between said source and any of said transformers normally is prevented, and means selectively connected to each row conductor between the respective other and the respective first circuits for altering the bias to cause current flow between any one of the said second windings through a respective other circuit to said bias source if a predetermined potential is applied to the column conductor coupled with said second winding.

References Cited in the file of this patent

UNITED STATES PATENTS

| | | |
|---|---|---|
| 2,563,589 | Hertog | Aug. 7, 1951 |
| 2,611,025 | Jankowski | Sept. 16, 1952 |
| 2,691,151 | Toulon | Oct. 5, 1954 |
| 2,849,703 | Bindon et al. | Aug. 26, 1958 |
| 2,913,706 | Thorensen et al. | Nov. 17, 1959 |

FOREIGN PATENTS

| | | |
|---|---|---|
| 711,053 | Great Britain | June 23, 1954 |
| 536,808 | Canada | Feb. 5, 1957 |

OTHER REFERENCES

Proceedings of the I.R.E., Feb. 1949, pp. 139–147.